US007058003B2

(12) United States Patent
You et al.

(10) Patent No.: US 7,058,003 B2
(45) Date of Patent: Jun. 6, 2006

(54) HAND-OFF PROCESSING APPARATUS AND METHOD FOR TELECOMMUNICATION SYSTEM

(75) Inventors: Cheol Woo You, Seoul (KR); Jee Woong Seol, Seoul (KR); Young Hwan Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 742 days.

(21) Appl. No.: 09/818,525

(22) Filed: Mar. 28, 2001

(65) Prior Publication Data
US 2002/0039356 A1    Apr. 4, 2002

(30) Foreign Application Priority Data
Mar. 29, 2000   (KR)   ................. 2000-16173

(51) Int. Cl.
*H04J 11/00*   (2006.01)
(52) U.S. Cl. ..................................... 370/203
(58) Field of Classification Search ........ 370/203–211, 370/310, 328, 329, 331–335; 455/403, 422
See application file for complete search history.

(56) References Cited

U.S. PATENT DOCUMENTS

| 5,907,582 | A | 5/1999 | Yi ............................ 375/259 |
| 5,978,365 | A | 11/1999 | Yi ............................ 370/331 |
| 6,292,918 | B1* | 9/2001 | Sindhushayana et al. ... 714/755 |
| 6,304,991 | B1* | 10/2001 | Rowitch et al. ............ 714/755 |
| 6,308,294 | B1* | 10/2001 | Ghosh et al. ............... 714/751 |
| 6,353,638 | B1* | 3/2002 | Hottinen et al. ............ 375/260 |
| 6,437,714 | B1* | 8/2002 | Kim et al. ..................... 341/81 |
| 6,519,732 | B1* | 2/2003 | Li .............................. 714/755 |
| 6,571,369 | B1* | 5/2003 | Li .............................. 714/792 |

OTHER PUBLICATIONS

TSG-RAN Working group 1(Radio) meeting #8, Oct. 12-15, 1999, 3GPP, pp. 1-8.*
TSG-RAN Working group 1 (Radio) meeting #4, Apr. 19-20, 1999, 3GPP.*
Burkert, Frank; Caire, Guiseppe; Hagenauer, Joachim; Hindelang, Thomas; and Lechner, Guenther, ""Turbo" Decoding with Unequal Error Protection Applied to GSM Speech Coding," Communications: The Key to Global Prosperity, Global Telecommunications Conference, New York, IEEE, vol. 3, Nov. 18, 1996, pp. 2044-2048, XP002924961.

* cited by examiner

*Primary Examiner*—Hanh Nguyen
*Assistant Examiner*—Dmitry Levitan
(74) *Attorney, Agent, or Firm*—Lee, Hong, Degerman, Kang & Schmadeka

(57) ABSTRACT

In an apparatus and method for performing a hand-off in a mobile communication system, a mobile terminal and two base stations transmit and receive two different transmission signals produced from a single communication signal in a soft hand-off processing, so that the reliability of the transmission signal and the transmission efficiency are improved without adding a particular hardware to the conventional communication system. In addition, the improvement of the reliability of the transmission signal is resulted in generation of gain in the aspect of the transmission power, the system performance or the user capacity.

12 Claims, 10 Drawing Sheets

HAND-OFF PROCESSING APPARATUS AND METHOD FOR TELECOMMUNICATION SYSTEM

CROSS-REFERENCE TO RELATED APPLICATIONS

Pursuant to 35 U.S.C. § 119(a), this application claims the benefit of earlier filing date and right of priority to the Korean Application No. 16173/2000, filed on Mar. 29, 2000, the content of which is hereby incorporated by reference herein in its entirety.

BACKGROUND OF THE INVENTION

1. Field of the Invention

The present invention relates to a hand-off processing apparatus and method for telecommunication system in which a transmission data is channel-coded and matched through a transmission rate matching algorithm, and more particularly, to a hand-off processing apparatus and method for telecommunication system in which a mobile terminal and two base stations transmit and receive two different transmission signals produced from a single communication signal in a soft hand-off processing, to thereby enhancing a communication quality and efficiency.

2. Description of the Background Art

Generally, a hand-off occurs frequently in a mobile communication system which consists of base stations and a mobile terminal As one of method for processing the hand-off, a soft hand-off processing method is widely employed.

A conventional mobile communication system using the soft hand-off method will now be described with reference to the accompanying drawings.

FIG. 1 is a block diagram of a CDMA (code division multiple access) diversity combining receiver of a base station in an up-link telecommunication system in which a data is transmitted from a mobile terminal to a base station in accordance with a conventional art.

The diversity technique refers to a receiving method for combining or converting receiving signals of various field strengths or various signal/noise ratios to obtain a single signal output to thereby reduce effect of a fading (in a wireless communication, when a radio wave is received through plural paths, the signals received through different paths interfere each other due to atmosphere refractivity change and obstacles, causing a change in an attenuation degree according to time change which leads to generation of distortion of ghost to the received signal).

As shown in FIG. 1, a CDMA diversity combining receiver of the base station includes a first and a second analog receivers 11 and 21 for receiving an analog radio frequency signal from a mobile terminal through antennas ANT1 and ANT2, converts the received radio frequency signal to an intermediate frequency signal, and amplifying and outputting the intermediate frequency signal; a first and a second searching units 12 and 22 for searching a signal transmitted from the mobile terminal among signals received through the first and the second analog receivers 11 and 21; a base station controller 31 for controlling rake receivers 13, 14, 23 and 24 to be described; a plurality of rake receivers 13, 14, 23 and 24 for transmitting a signal determined by the base station controller 31; a diversity combiner 32 for combining the signals transmitted from the plurality of rake receivers 13, 14, 23 and 24 to obtain a diversity and generating a signal; and a decoder 33 for decoding the combined signal and transmitting the decoded signal to a master switching center (MSC).

The operation of the CDMA diversity combining receiver of the conventional art constructed as described above will now be explained with reference to the accompanying drawings.

The two antennas ANT1 and ANT2 receive independently an analog frequency signal transmitted from a mobile terminal, respectively. Then, the first and the second analog receivers 11 and 21 receives the analog radio frequency (RF) signal, converts it to an intermediate frequency (IF) signal, amplifies the intermediate frequency signal and transmits it to the first and the second searching units 12 and 22 and to the plurality of rake receivers 13,14, 23 and 24.

Then, the first and the second searching units 12 and 22 searches a pilot signal (a synchronous signal transmitted to obtain a subcarrier indicating signal difference by a receiver in a wireless communication system) transmitted from the mobile terminal and computes a signal-to-interference ratio of the pilot signal. Then, the base station controller 31 discriminates which mobile terminal has transmitted the signal by using the computed value and informs the rake receivers 13, 14, 23 and 24 of the discrimination result.

Thereafter, in order to obtain a diversity, the diversity combiner 32 combines signals outputted from the plurality of rake receivers 13, 14, 23 and 24. The combined signal is subjected to decoding by the decoder 33 and transmitted to the master switching center.

FIG. 2 is a diagram showing a relationship between a mobile terminal communication with two base stations and the master switching center in a hand-off in accordance with the conventional art.

In the case that the mobile terminal 10A moves from a zone 20A of a base station 'A' 20A-1 to a zone 20B of a base station 'B' 20B-1, when the mobile terminal 10A enters the handoff region between the two base stations 20A-1 and 20B-1, hand-off occurs (the previous communication channel is switched to a communication channel of a new zone to go on to make a communication in a different quality).

In the hand-off region, the mobile terminal 10B of which a hand-off mode has been set transmits and receives a signal to and from the master switching center 100 through the base station 'A' 20A-1 and the base station 'B' 20B-1 simultaneously.

In this manner, during the soft hand-off operation in accordance with the conventional art, the mobile terminal improves a reliability of a signal by using the diversity method combining the signals transmitted from the several base stations by means of the rake receiver. That is, the mobile terminal 10B transmits and receives the same signal to and from the base stations 'A' and 'B'.

However, the soft hand-off method of the conventional art has problems of signal interference (when a radio wave is received, various other radio waves are absorbed to interfere the original radio wave), fading of a signal and echoing of a signal (when a radio wave is received through more than two paths, the same signal repeatedly appears as the radio wave reaches at different time point due to the path difference, causing that a receiving signal is distorted or a sound quality is deteriorated.

The standard groups of the next generation mobile communication system such as 3GPP adopts a turbo coding as a standard of the mobile communication. The turbo coding refers to a method in which one signal is coded in a various methods and the generated coded signal is multiplied by a gain, and then the resulted signal is transmitted from a mobile terminal to a base station or from a base station to a mobile terminal, simultaneously.

SUMMARY OF THE INVENTION

Therefore, an object of the present invention is to provide a hand-off processing apparatus and method for a mobile communication system in which a mobile terminal makes one transmission signal into two different transmission signals and transmits and receives the different transmission signals through a master switching center to and from two base stations, thereby improving a speech quality.

Another object of the present invention is to provide a hand-off processing apparatus and method for a mobile communication system that is capable of improving a reliability of a transmission signal without installing a specific hardware.

To achieve these and other advantages and in accordance with the purpose of the present invention, as embodied and broadly described herein, there is provided a hand-off processing apparatus for a down-link telecommunication system including: a first coder for coding an inputted bit stream and outputting it; an interleaver for interleaving the input bit stream and outputting it; a second coder for coding the codeword bit stream outputted after being interleaved by the interleaver and outputting it; a first and a second rate matching algorithm processing units for receiving the output bit stream of the first and the second coders and generating outputs of different patterns by using a first and a second rate matching algorithms, respectively; a first and a second multiplexers for sequentially outputting the codeword bit streams outputted after being generated by the first and the second rate matching algorithm processing units to two base stations, respectively; a deplexer for converting the codeword bit streams outputted from the two base stations to a form of radio frequency transmission signal, receiving and deplexing the transmitted radio frequency signal; an analog receiver for receiving the deplexed radio frequency signal, converting it to an intermediate frequency (IF) signal and amplifying it; a searching unit for continuously searching a pilot signal transmitted from the two base stations over the radio frequency signal inputted from the analog receiver and computing signal-to-interference ratio of the pilot signal; a base station controller for discriminating from which base station a signal searched by the searching unit has been transmitted by using the computed value of the signal-to-interference ratio of the pilot signal; a rake receiver for inputting signals transmitted from the two base stations to a code combiner according to the discrimination of the base station controller; a code combiner for converting the inputted two signals to a single type of data stream and outputting it; and a repeating decoder for receiving the data stream and performing decoding.

To achieve the above objects, there is also provided a hand-off processing method for a down-link telecommunication system including the steps of: coding an inputted bit stream; interleaving the input bit stream; coding the interleaved bit stream; performing rate matching at different rates for the codeword bit streams outputted after being coded; sequentially outputting the codeword bit streams which have been rate-matched at different rates to the two base stations; receiving and deplexing a radio frequency signal transmitted from the two base stations; receiving the deplexed radio frequency signal, converting it to an intermediate frequency (IF) signal and amplifying it; continuously searching a pilot signal inputted from the two base stations over the converted and amplified signals and computing a signal-to-interference ratio of the pilot signal; discriminating from which base station the searched radio frequency signal has been inputted and informing it to two rake receivers; outputting the signals inputted from the base station 'A' and the base station 'B' to a code combiner according to the discrimination; converting the two signals inputted to the code combiner to a single type of data stream and outputting it; and receiving the data stream, performing decoding for the data stream and outputting it.

To achieve the above objects, there is also provided a hand-off processing apparatus for an up-link telecommunication system including a coder for making one signal to be transmitted from a mobile terminal to a base station into two signals, that is, two kinds of data streams, and outputting them; a code generator for generating pertinent base station codes to be respectively multiplied to the two signals so as to identify which one of two signals outputted from the coder is for the pertinent base station; and a multiplier for multiplying the two signals outputted from the coder by the generated base station codes and outputting them.

To achieve the above objects, there is also provided a hand-off processing method for an up-link telecommunication system including the steps of: making one signal to be transmitted from a mobile terminal to a base station into two signals, that is, two types of data streams, and outputting them; generating pertinent base station codes to be multiplied to the two signals to identify one of the two outputted signals is for a pertinent base station; multiplying the two outputted signals by the generated base station codes.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
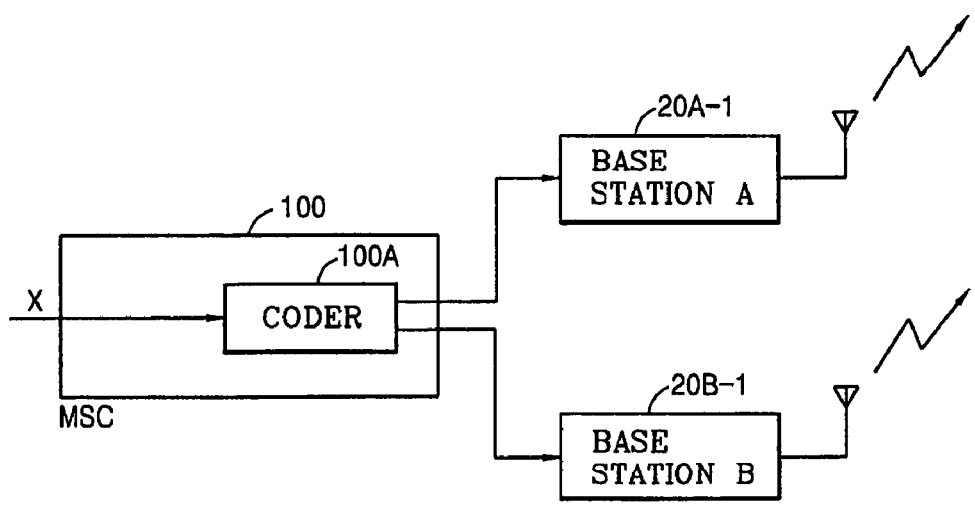
FIG. 3 is a diagram of a hand-off processing apparatus between a master switching center and two base stations in-a down-link telecommunication system in accordance with the present invention.

FIG. 3 is a diagram of a hand-off processing apparatus between a master switching center and two base stations in a down-link telecommunication system in accordance with the present invention, which includes a master switching center 100 for making a signal of a bit stream to be transmitted into two different codeword bit streams, a base station 'A' 20A-1 and a base station 'B' 20B-1 for transmitting the signal made by the master switching center 100 to a mobile terminal.

Figure 4:
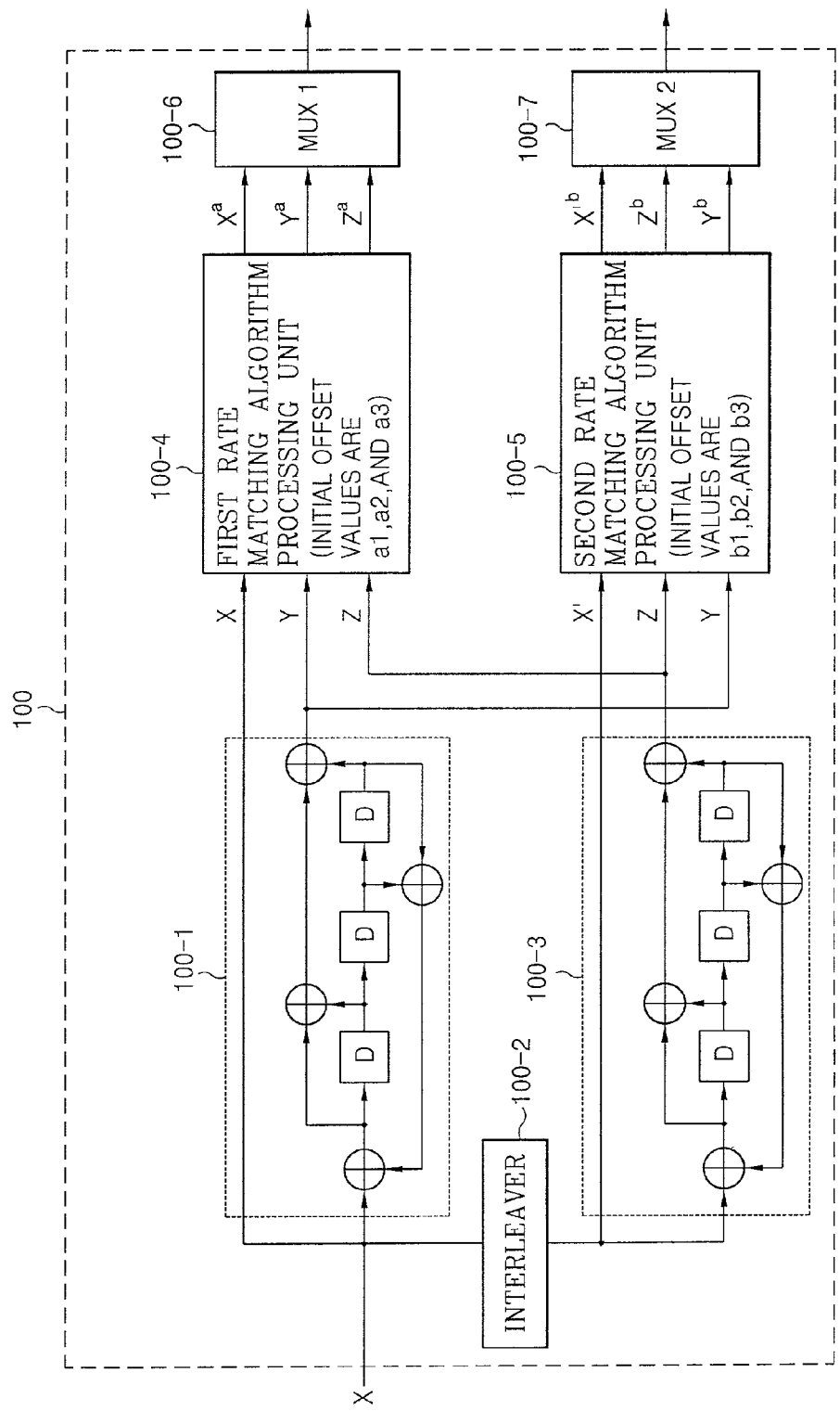
FIG. 4 is a detailed view of a turbo coder of FIG. 3 in accordance with the present invention.

FIG. 4 is a detailed view of a turbo coder of FIG. 3 in accordance with the present invention. A coder 100A of the master switching center 100 is the turbor coder. The coder 100A includes a first coder 100-1 for first coding a bit stream inputted to the master switching center 100 and outputs the coded bit stream, an interleaver 100-2 for interleaving the input bit stream, a second coder 100-3 for secondarily coding the input bit stream outputted after being interleaved by the interleaver 100-2 and outputting the coded bit stream, a first rate matching algorithm processing unit 1004 for receiving one of the two cordword bit streams (X, Y) coded by the first coder 100-1 and one (Z) of the cordword bit streams coded by the second coder, performing rate matching, and generating and outputting new codeword bit streams ($X^a$, $Y^a$, $Z^a$); a second rate matching algorithm processing unit 100-5 for receiving the two codeword bit streams (X', Z) coded by the second coder 100-3 and one (Y) of the bit streams coded by the first coder, performing rate matching, and generating and outputting new codeword bit streams ($X'^b$, $Y^b$, $Z^b$); and a first and a second multiplexers 100-6 and 100-7 for sequentially outputting the codeword bit streams outputted after being generated by the first and the second rate matching algorithm processing units 100-4 and 100-5 to two base stations, respectively The operation and effect of the hand-off processing apparatus for the master switching center and the two base stations in a down-link telecommunication system constructed as described will now be explained.

In the down-link telecommunication system in which a data is transmitted from the master switching center 100 through the base station to the mobile terminal, the master switching 100 inputs a signal to be transmitted, that is, the input bit stream (X), to the coder 100A as shown in FIG. 3. Then, the coder 100A generates different two signals by using the inputted signal and transmits each signal both to the base stations 20A-1 and 20B-1.

The operation of the coder 100A will now be described with reference to FIG. 4.

First, the first coder 100-1 receives the signal to be transmitted, that is the s input bit stream (X), codes it and outputs a generated codeword bit stream (Y). AT the same time, the interleaver 100-2 receives the input bit stream (X) and performs interleaving and outputs a converted bit stream (X'). At this time, the input bit stream (X) and the converted bit stream (X') includes the same data bits but in a different order.

The second coder 100-3 receives the converted bit stream (X') outputted from the interleaver 100-2 and codes it and outputs a generated codeword bit stream (Z).

Then, the first rate matching algorithm processing unit 100-4 simultaneously receives the input bit stream (X), the codeword bit stream (Y) generated by the first coder 100-1 and the codeword bit stream (Z) generated by the second coder 100-3.

And at the same time, the second rate matching algorithm processing unit 100-5 simultaneously receives the converted bit stream (X') from the interleaver 100-2, the codeword bit stream (Z) generated by the second coder 100-3 and the codeword bit stream (Y) generated by the first coder 100-1. And then, the first and the second rate matching algorithm processing units 100-4 and 100-5 perform rate matching for the inputted codeword bit streams.

The first and the second rate matching algorithm processing units 100-4 and 100-5 generates different patterns of output bits by adjusting adequately the first and the second rate algorithms. Several methods may be used to make two different data by using the rate matching. In the preferred embodiment of the present invention, The first and the second rate matching algorithm processing units 100-4 and 100-5 respectively set different initial offset values (a1, a2, a3)(b1, b2, b3) for performing rate matching. The rate matching may be separately performed for each of the codeword bit streams (X, Y, Z)(X', Z, Y) or performed for all of the cordword bit streams by one time. In this respect, the initial offset values determine a starting point when a specific signal is repeated or removed.

As for each bit stream of the cordword bit streams (X, Y, Z) (X', Z, Y), when the rate matching ratio (that is, the amount of the repeated or the removed) is the same while the initial offset values are different, the removed or repeated data are different as follows.

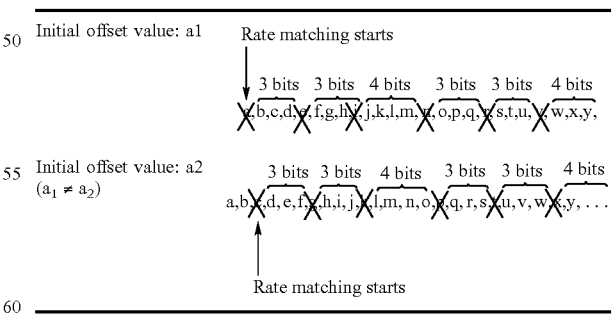

As a result, the first rate matching algorithm processing unit 100-4 generates new codeword bit streams ($X^a$, $Y^a$, $Z^a$) and inputs them to the first multiplexer 100-6. The second rate matching algorithm processing unit 100-5 generates different codeword bit streams ($X'^b$, $Y^b$, $Z^b$) and inputs them to the second multiplexer 100-7.

Thereafter, the codeword bit streams respectively inputted to the first and the second multiplexers 100-6 and 100-7 are sequentially inputted to the two base stations 20A-1 and 20B-1.

Figure 5:
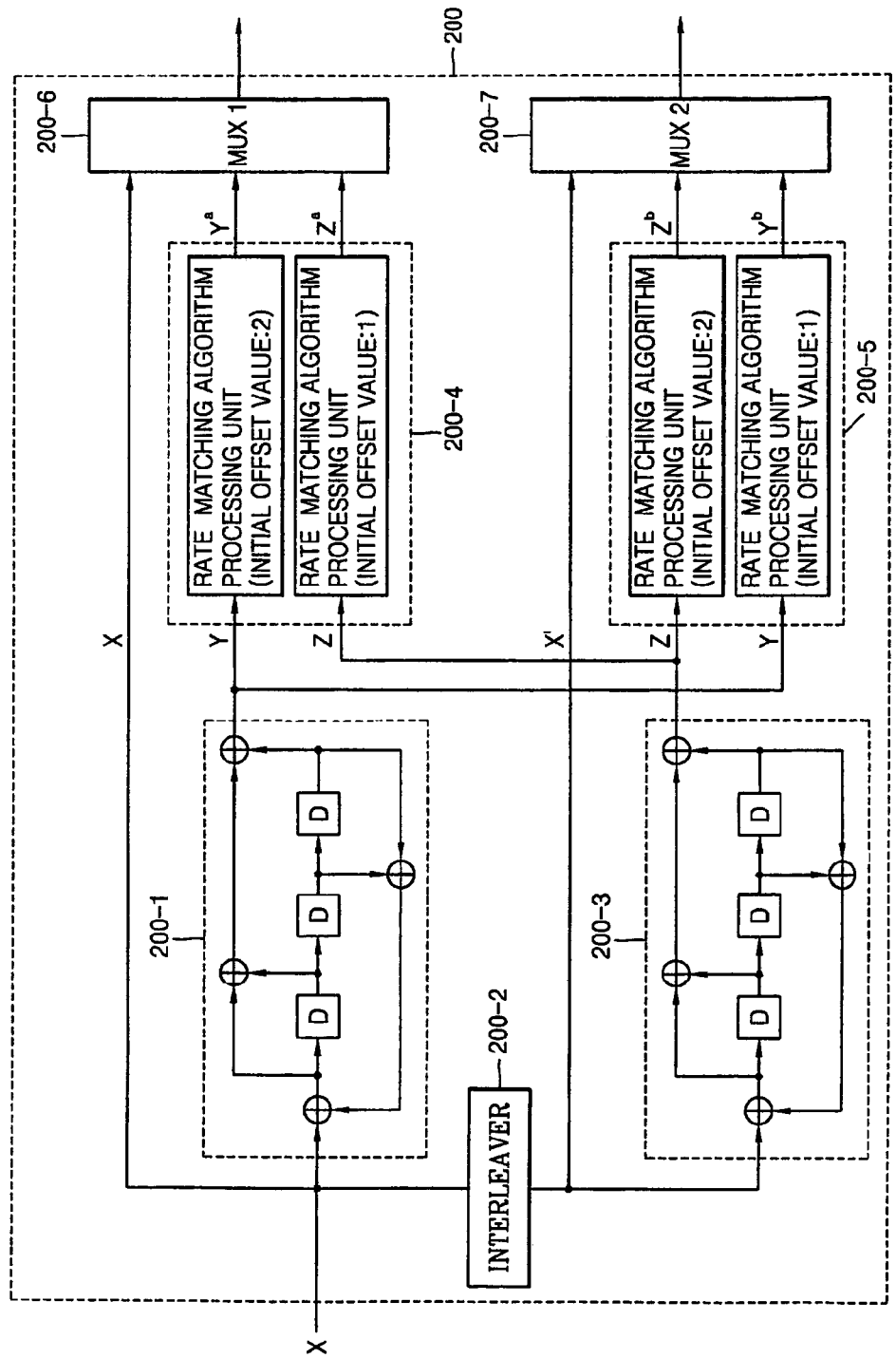
FIG. 5 is a detailed view of a turbo coder in use for a 3GPP in accordance with the present invention.

FIG. 5 is a detailed view of a turbo coder in use for a 3GPP in accordance with the present invention.

Unlike coder 100 of FIG. 4 as described above, in coder 200 of FIG. 5, the input bit streams (X) and (X') are respectively inputted to the first and the second multiplexers 200-6 and 200-7 without undergoing the rate matching algorithm.

Then the first rate matching algorithm processing unit 200-4 performs the rate matching for the codeword bit stream (Y) outputted from the first coder 200-1 and the codeword bit stream (Z) outputted from the second coder 200-3 by having '2' and '1' as respective initial offset values, and the second rate matching algorithm processing unit 200-5 performs rate matching for the codeword bit stream (Y) outputted from the first coder 200-1 and the codeword bit stream (Z) output from the second coder 200-3 by having '1' and '2' as respective initial offset values.

Thereafter, the first and the second rate matching algorithm processing units 200-4 and 200-5 input the codeword bit streams ($Y^a$, $Z^a$) to the first and the second multiplexers 200-6 and 200-7. The codeword bit streams inputted to the first and the second multiplexers 200-6 and 200-7 are sequentially provided to the two base stations 20A-1 and 20B-1, respectively.

Figure 6:
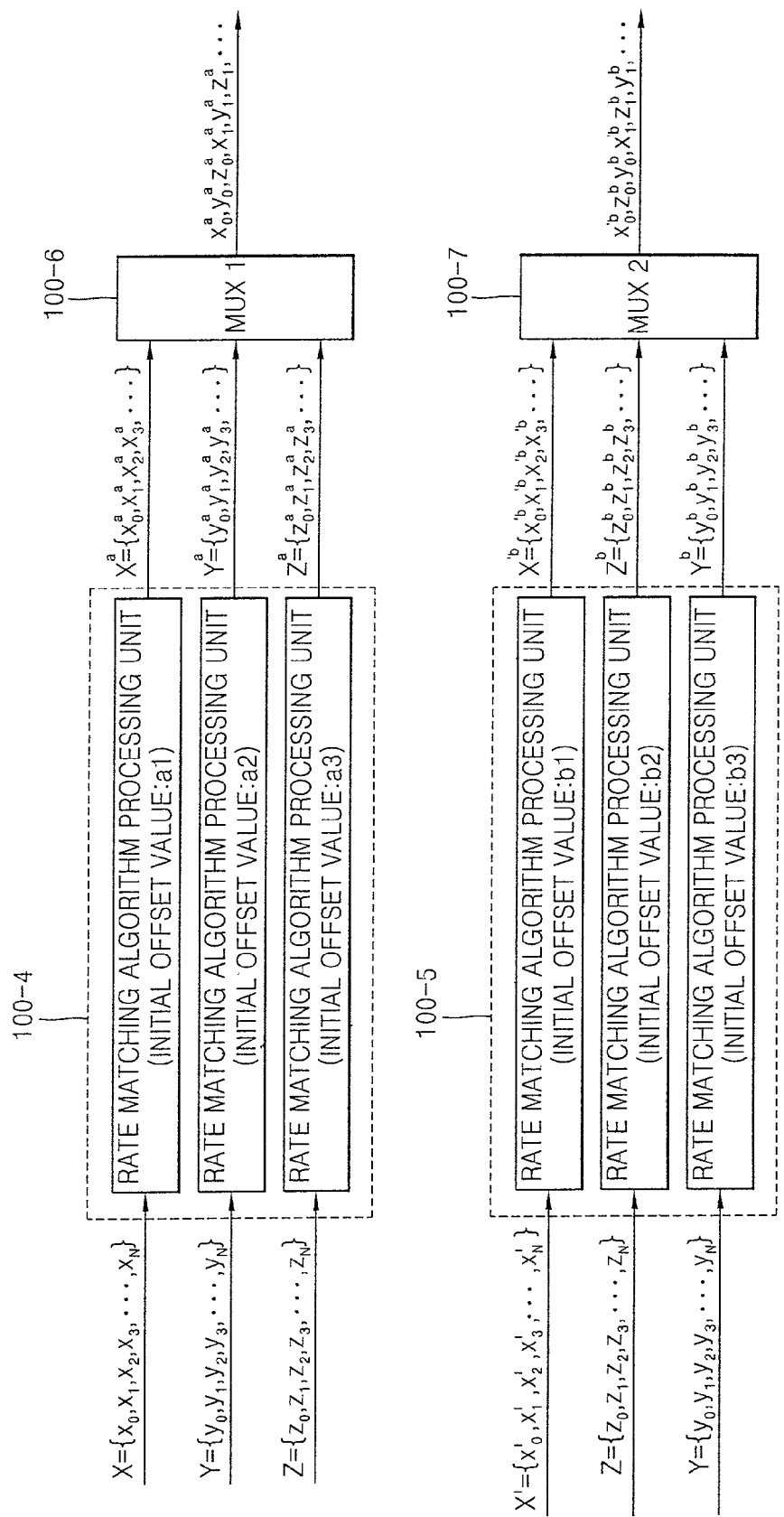
FIG. 6 is a detailed view of an example of a rate matching algorithm processing unit of FIG. 4 in accordance with the present invention.

FIG. 6 is a detailed view of an example of the rate matching algorithm processing units 100-4 and 100-5 of FIG. 4 in accordance with the present invention.

As shown in the drawings, the first and the second rate matching algorithm processing units 100-4 and 100-5 matches the inputted signals (X, Y, Z) and (X', Z, Y) according to the respective initial offset values and rate matching ratio and outputs different signals ($X^a$, $Y^a$, $Z^a$) and ($X'^b$, $Z^b$, $Y^b$).

Generally, the first input bit stream (X) of the first rate matching algorithm processing unit 100-4 and the input bit stream (X') of the second rate matching algorithm processing unit 100-5 have the same rate matching ratio and initial offset values to be rate-matched. Namely, the repeated or removed amount of data is the same, and at the same time, the position of the repeated or removed data is also the same to each other.

However, the input bit stream (X') is the result of interleaving for the input bit stream (X). Thus, if an interleaver of good capacity is used, the data at the same position of the two input bit streams would be different data. Thus, in the two input bit streams, the probability that the repeated or the removed data are different is high, and thus, generally, the rate matching is not performed for the two input bit streams constructed with the same data as the input signal of the coder 100A to obtain the maximum capacity of the coding.

In the meanwhile, the input bit streams 'Y' and 'Z' of the first and the second rate matching algorithm processing units 100-4 and 100-5 undergoes rate matching by having the same rate matching ratios and different initial offset values. Therefore, in each case, the repeated or removed amount of data are the same, whereas the repeated or removed data are different.

Figure 7:
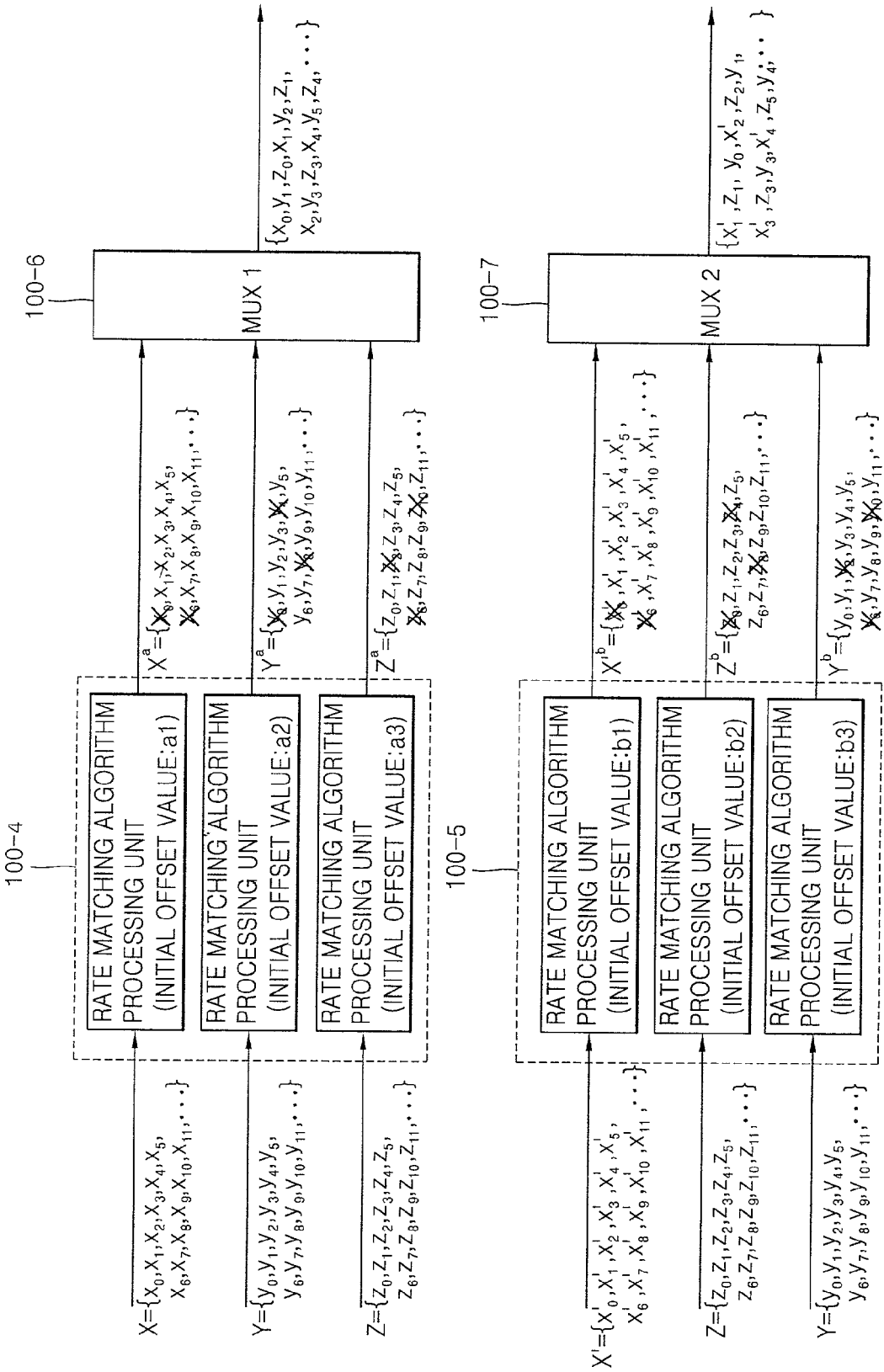
FIG. 7 is a detailed view of another example of a rate matching algorithm processing unit of FIG. 4 in accordance with the present invention.

FIG. 7 is a detailed view of another example of a rate matching algorithm processing units 100-4 and 100-5 of FIG. 4 in accordance with the present invention and the rate matching algorithm is substantially applied thereto.

As shown in the drawing, the data stream of the codeword bit streams outputted from the first and the second rate matching algorithm processing units 100-4 and 100-5 have different initial offset values and rate matching ratios.

Figure 8:
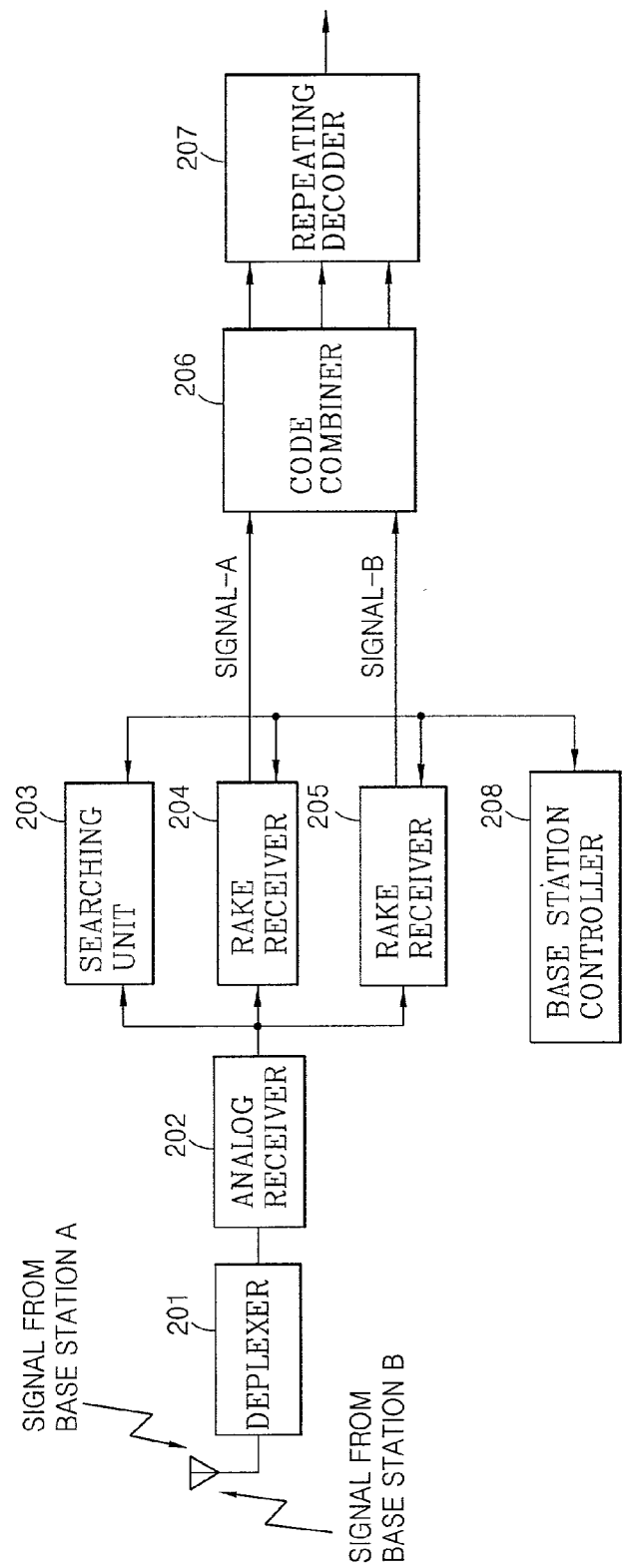
FIG. 8 is a diagram of a hand-off processing apparatus for a mobile terminal receiver in a down-link telecommunication system in accordance with the present invention.

FIG. 8 is a diagram of a hand-off processing apparatus for a mobile terminal receiver in a down-link telecommunication system in accordance with the present invention. The apparatus includes a deplexer 201 for receiving and deplexing a radio frequency signal transmitted from two base stations; an analog receiver 202 for receiving and converting the deplexed radio frequency signal to an intermediate frequency signal and amplifying the intermediate frequency signal, a searching unit 203 for continuously searching for a pilot signal transmitted from the two base stations from among the radio frequency signals input through the analog receiver and computing a signal-to-interference ratio of the pilot signal; an base station controller 208 for determining from which base station the signal has been received by using the computed value and informing two rake receiver 204 and 205 accordingly, two rake receivers 204 and 205 for outputting the signals received from base station 'A' and base station 'B' to a code combiner 206 according to the determination of the base station controller 208, the code combiner 206 converting and outputting the two signals from the two rake receivers 204 and 205 as a single type of data stream, and repeating decoder 207 for receiving the data stream and performing coding.

The operation and effect of the hand-off apparatus processing for a mobile terminal receiver in the down-link telecommunication system will now be described.

As shown in FIG. 8, different two transmission signals inputted to the two base stations are transmitted to the deplexer 201 and to the analog receiver 202 of the mobile receiver. At this time, the deplexer 201 enables simultaneous transmission and receiving with a single antenna, and the analog receiver 202 converts the received radio frequency signal to an intermediate frequency signal, amplifies the intermediate frequency signal and inputs it to the searching unit 203 and to the two rake receivers 204 and 205.

After searching the pilot signal transmitted from the mobile terminal, the searching 203 computes a signal-to-interference ratio of a pilot signal. The base station controller 208 discriminates from which base station the pilot signal has been received, by using the computed value and informs the two rake receivers 204 and 205 of the discrimination.

Thereafter, the rake receiver 204 processes the signal transmitted from the base station 'A', and the rake receiver 205 processes the signal transmitted from the base station 'B' and the two rake receivers 204 and 205 inputs the processed signals to the code combiner 206.

In this respect, the rake receivers may be varied in number as required, and the two signals are two different types of data streams which have been generated from one data stream.

Then, the code combiner 206 combines the two signals of the base station 'A' and the base station 'B' received to the two rake receivers 204 and 205 and converts it to the original one type of data streams.

Thereafter, the converted data streams are inputted to the repeating decoder 207, and the repeating decoder 207 recognizes the data streams converted through decoding as one signal.

Figure 9:
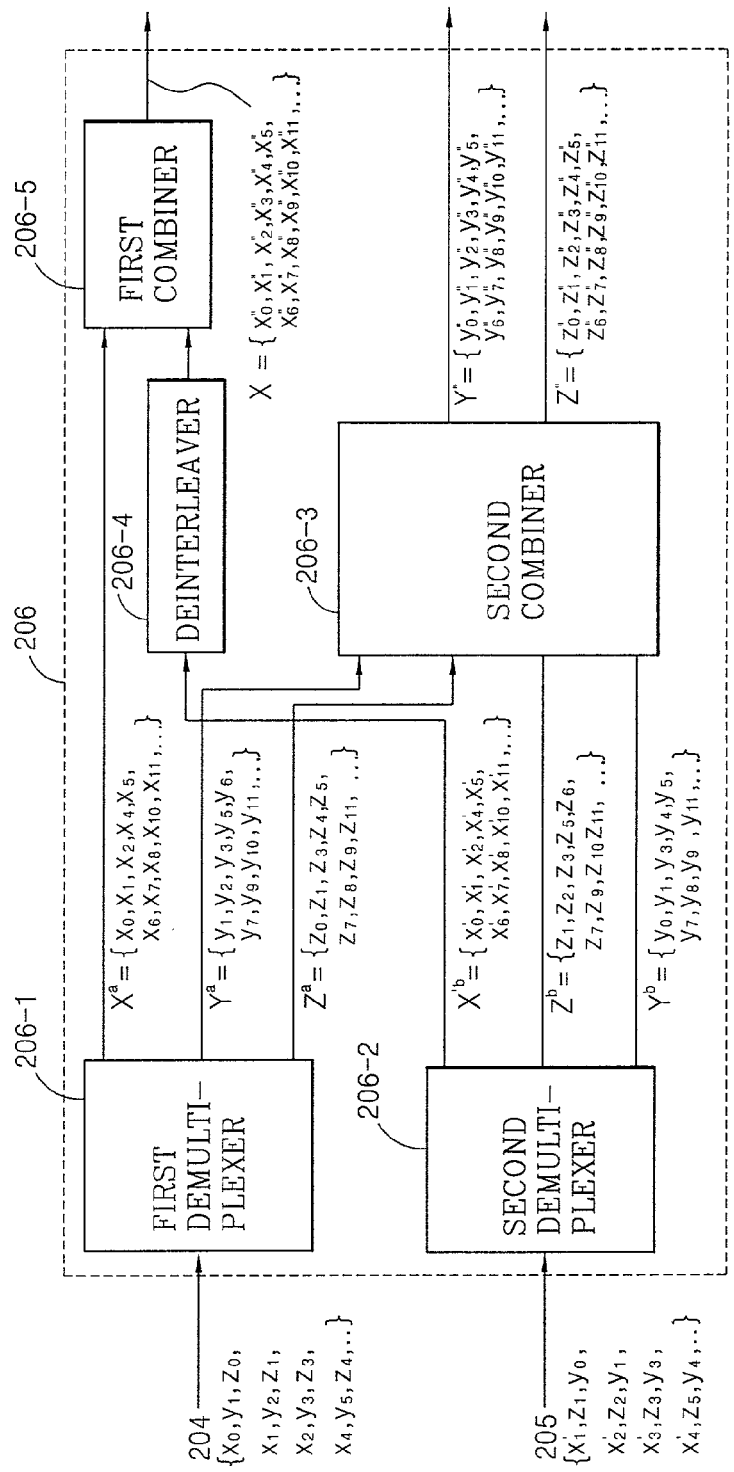
FIG. 9 is a detailed view of a code combiner of FIG. 7 in accordance with the present invention.

FIG. 9 is a detailed view of the code combiner of FIG. 8 in accordance with the present invention.

The operation of the code combiner 206 will now be described

As shown in FIG. 9, the signal outputted after being outputted from the base station 'A' and processed by the rake receiver 204 is classified by the codeword bit streams ($X^a$, $Y^a$, $Z^a$) by the first demultiplexer 206-1.

The signal outputted after being processed by the rake receiver 205 is classified by the codeword bit streams ($X^b$, $Y^b$, $Z^b$) by the second demultiplexer 206-2. The classified two codeword bit streams, that is, the two signals ($Y^a$, $Y^b$), are converted to a signal (Y") by the second code combiner, and the two signals ($Z^a$, $Z^b$) are converted to a signal (Z").

The signal ($X'^b$) is restored to its original input bit stream through a deinterleaver 206-4, that is, in the order of the transmission signal (X) and combined with the codeword bit stream by the first combiner 206-5, that is, the signal (Xa) to be a signal (X").

At this time, the first and the second combiners 206-5 and 206-3 combine two signals t1 and t2 and generate a new signal 't'.

$$T = a_1 t_1 + a_2 t_2$$

In the above formula, $a_1$ and $a_2$ are variables determined depending on a combining method, and in case of using an MRC (Maximal Ratio Combining) method, they are determined according to the measured amplitude of a signal.

Figure 10:
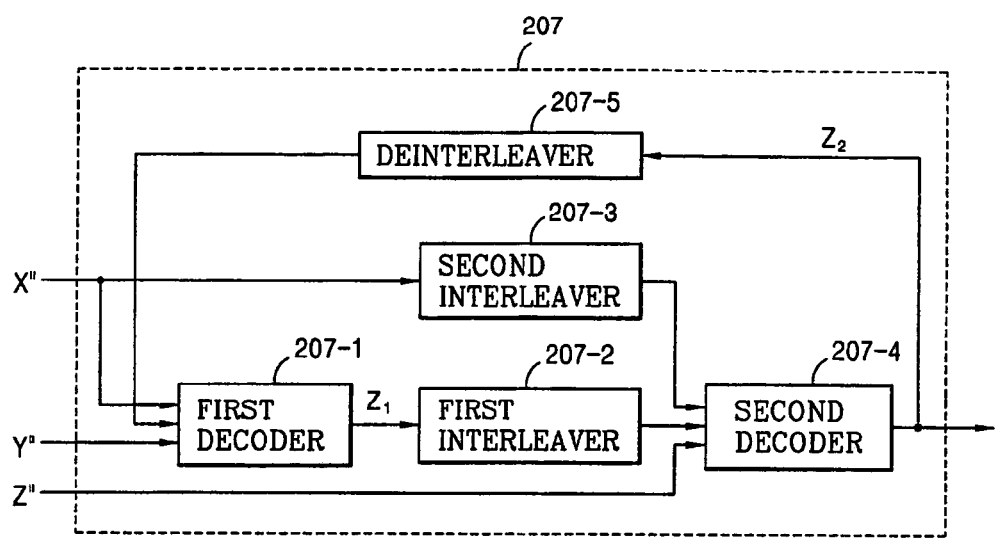
FIG. 10 is a detailed view of a repeating decoder of FIG. 8 in accordance with the present invention.

FIG. 10 is a detailed view of a repeating decoder of FIG. 8 in accordance with the present invention.

The operation of the repeating decoder 207 after receiving the signals (X", Y", Z") which have been combined by the code combiner 206 will now be described.

The first decoder 207-1 receives the two signals (X", Y") of the signals (X", Y", Z") outputted from the code combiner 206, performs decoding and inputs a bit ($Z_1$) generated through decoding to the first interleaver 207-2.

Then, the first interleaver 207-2 interleaves the inputted bit $Z_1$ and inputs it to the second decoder 207-4.

At this time, a second interleaver 207c receives the signal (X") of the signals (X", Y", Z") outputted from the code combiner 206, interleaves it and inputs it to the second decoder 207-4.

Then, the second decoder 207-4 receives the bit outputted from the first and the second interleavers 207-2 and 207-3 and the bit (Z") outputted from the code combiner 206, decodes them to generate a new bit ($Z_2$), and inputs the bit ($Z_2$) to the deinterleaver 207-5.

Then the deinterleaver 207-5 receives the bit ($Z_2$), deinterleaves it and inputs a generated bit to the first decoder 207-1.

In this manner, the first and the second decoders 207-1 and 207-4 mutually receive and transmit the generated bit (Z1 and the bit (Z2) generated after being decoded and perform decoding repeatedly.

Figure 11:
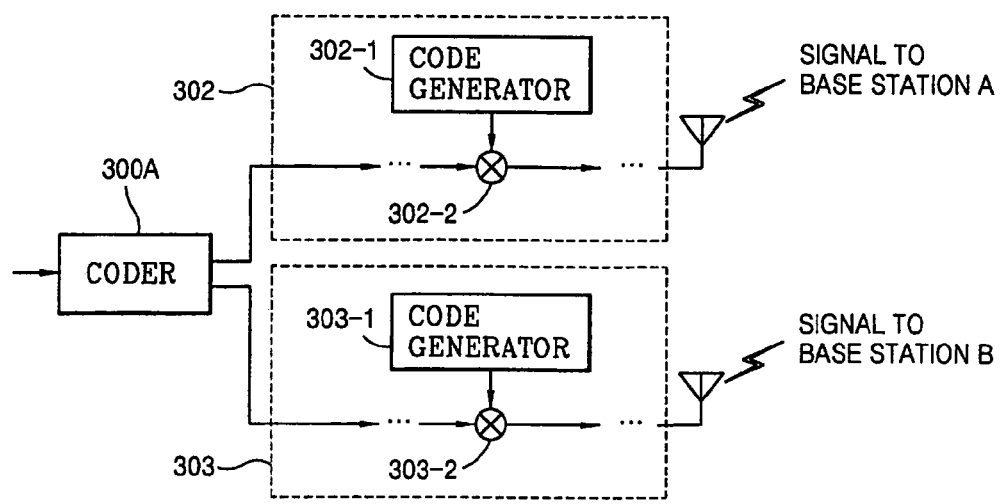
FIG. 11 is a diagram of a hand-off processing apparatus for a mobile terminal receiver in the up-link telecommunication system in accordance with the present invention.

FIG. 11 is a diagram of a hand-off processing apparatus for a mobile terminal receiver in the up-link telecommunication system in accordance with the present invention. The apparatus includes a coder 300A for generating and outputting two different signals from one signal in hand-off, and two base station recognizing units 302 and 303 for assigning corresponding base station codes to the two signals output from the coder 300A and transmitting them to the base station. Each of the two base station recognizing units 302 and 303 include code generators 302-1 and 303-1 for generating a base station code and multipliers 302-2 and 303-2 for multiplying the transmission signal form the coder 300A by the base station code and outputting the multiplied signal.

The operation and effect of the hand-off processing apparatus for the mobile terminal receiver in the up-link telecommunication system will now be described.

As shown in FIG. 11, the coder 300A which has the same structure and function as the coder 100A of FIG. 3, generates two different signals from a signal generated by the mobile terminal receiver and transmits the two different signals to the two base station recognizing units 302 and 303.

Then, in order to determine which of the two signals output from the coder 300A is for a corresponding base station, the two base station recognizing units 302 and 303 multiply the signal generated by the coder 300A by the base station code generated by the code generators 302-2 and 303-2 and transmit the multiplied signal to base station 'A' and base station 'B', respectively.

Figure 12:
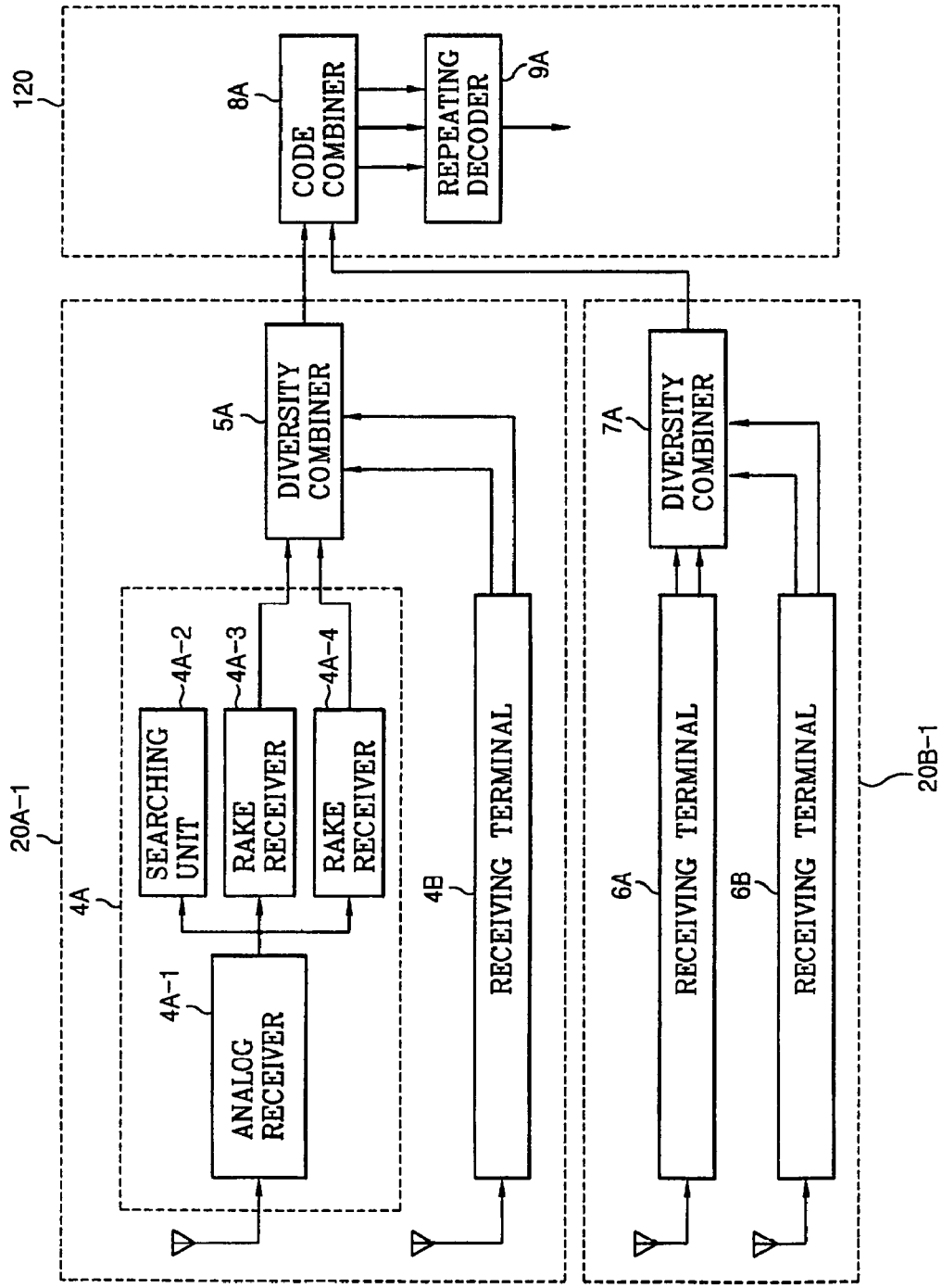
FIG. 12 is a detailed view of two base stations and the master switching center in the up-link telecommunication system in accordance with the present invention.

FIG. 12 is a detailed view of two base stations and the master switching center in the up-link telecommunication system in accordance with the present invention.

The operation of the two base stations and the master switching center which receive and process the two signals transmitted from the two base station recognizing units 302 and 303 of FIG. 11 will now be described.

Figure 1:
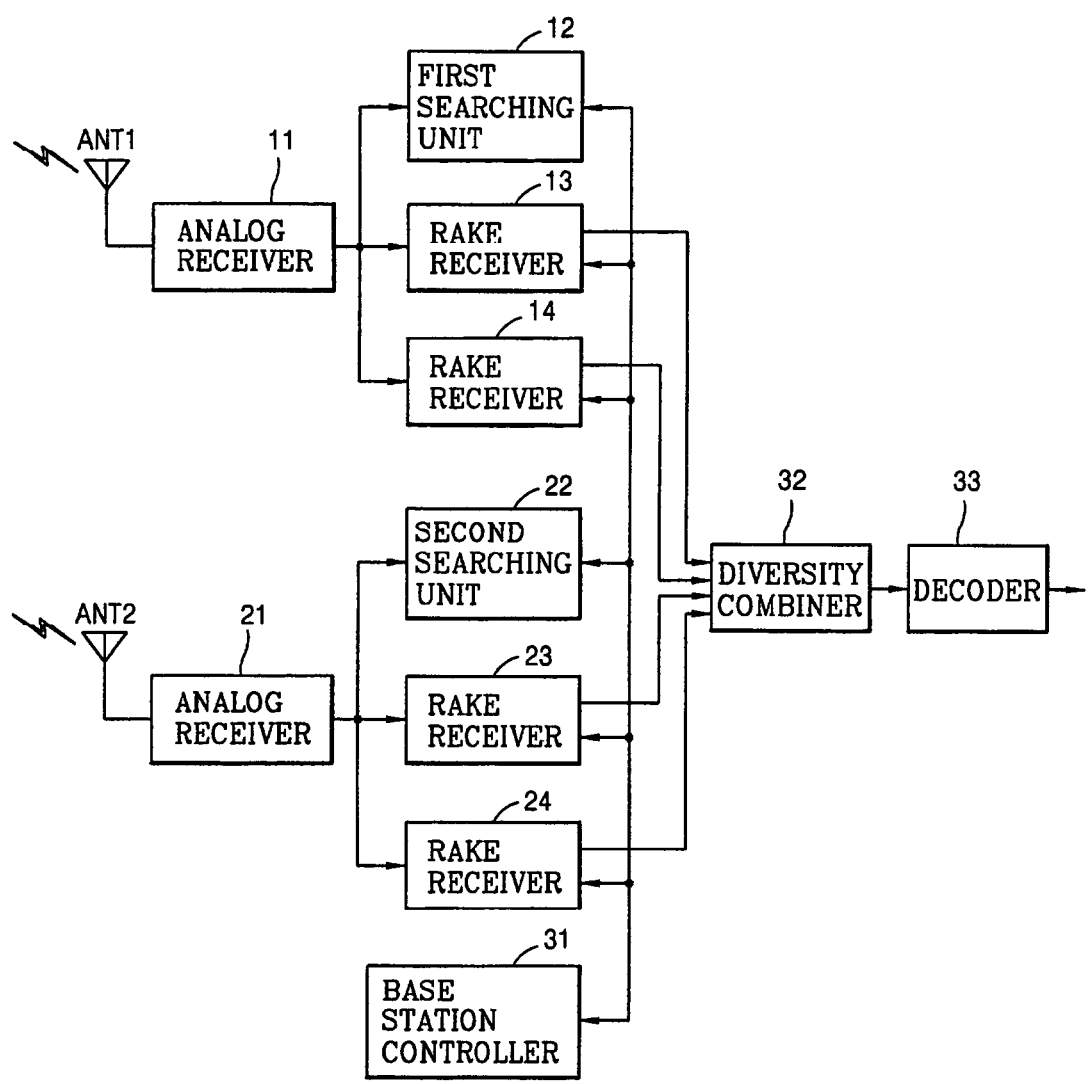
FIG. 1 is a block diagram of a CDMA (code division multiple access) diversity combining receiver of a base station in an up-link telecommunication system in which a data is transmitted from a mobile terminal to a base station in accordance with a conventional art.
Figure 2:
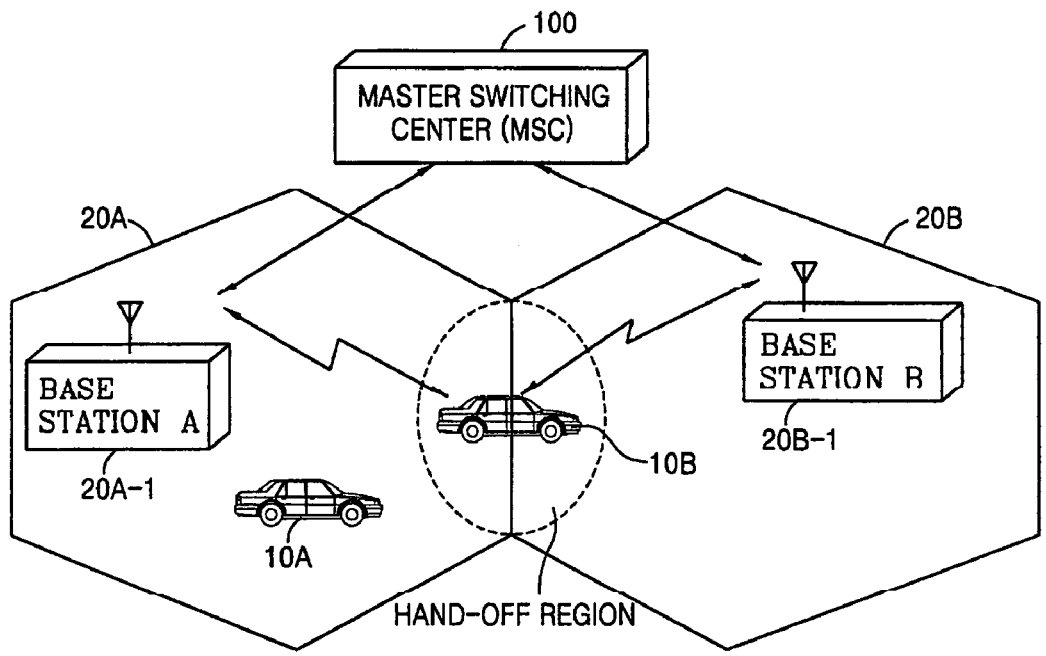
FIG. 2 is a diagram showing a relationship between a mobile terminal communication with two base stations and a master switching center in hand-off in accordance with the conventional art.

An analog receiver 4A-1 of the base station 'A' 20A-1 receives one of the signals transmitted from the two base station recognizing units 302 and 303 of the mobile terminal receiver and converts it to an intermediate frequency (IF0) signal. The base station 'A' 20A-1 has the same structure as the conventional CDMA diversity coming receiver shown in FIG. 1, except that a decoder is not provided.

However, the main difference between the two base stations 'A' and 'B' and the conventional CDMA diversity combining receiver is that the decoding is performed in a master switching center 120 as shown in FIG. 12 not in the base station.

Thereafter, when a searching unit 4A-2 searches a radio frequency (RF) signal transmitted from the mobile terminal, two rake receivers 4A-3 and 4A-4 transmit the signal searched by the searching unit 4A-2 to a diversity combiner 5A, respectively. At this time, another receiving terminal 4B performs the same operation as that of one receiving terminal 4A and transmits the searched signal to the diversity combiner 5A. In this respect, the structure and the operation of the base station 'B' 20B-1 are the same as those of the base station 'A' 20A-1.

Thereafter, in order to obtain a diversity from the signals transmitted from the rake receivers of the receiving terminals 4A and 4B, the diversity combiner 5A performs combining.

Two signals combined by the diversity combiners 5A and 7A of the two base stations 'A' 20A-1 and 'B' 20B-1 are again combined by a code combiner 8A of the master switching center 120 such that they are converted to their original single type of data stream. The converted data streams are then decoded by a repeating decoder 9A. The operations of the code combiner 8A and the repeating decoder 9A are the same as, respectively, the code combiner of FIG. 9 and the repeating decoder of FIG. 10.

In this manner, in the down-link telecommunication system, the mobile terminal receiver performs decoding, and in the up-link telecommunication system of FIG. 12, the master switching center 120 performs decoding. Before performing decoding, the code combiner 8A of the master switching center 120 receives a signal having two types of base station codes generated by the two base station recognizing units 302 and 303 of the mobile terminal receiver and generates a single type of signal which is then decoded by the repeating decoder 802.

As so far described, according to the hand-off apparatus processing for a mobile communication system, the reliability of the transmission signal and the transmission efficiency are improved without adding a particular hardware to the conventional communication system.

In addition, the improvement of the reliability of the transmission signal is resulted in generation of gain in the aspect of the transmission power, the system performance or the user capacity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A hand-off processing apparatus for a down-link telecommunication system, the apparatus comprising:
    a first coder for coding an input bit stream and outputting a coded bit stream;
    an interleaver for interleaving the input bit stream and outputting an interleaved bit stream;
    a second coder for coding the interleaved bit stream from the interleaver and outputting an interleaved coded bit stream;
    first and second rate matching algorithm processing units for receiving the coded bit stream and interleaved coded bit stream and for generating rate matched bit streams having different patterns by using first and second rate matching algorithms, respectively; and
    first and second multiplexers for outputting the rate matched bit streams generated by the first and the second rate matching algorithm processing units,
    wherein the initial offset value of the first rate matching algorithm processing unit is different from the initial offset value of the second rate matching algorithm processing unit.

2. The apparatus of claim 1, wherein the first rate matching algorithm processing unit and the second rate matching algorithm processing unit use the same algorithm.

3. A hand-off processing apparatus for a mobile communication system, comprising:
    a first coder for coding an input bit stream and outputting a first coded bit stream;
    a second coder for coding an input bit stream and outputting a second coded bit stream;
    a first rate matching algorithm processing unit for receiving the first coded bit stream, performing rate matching, and generating a first rate matched bit stream;
    a second rate matching algorithm processing unit for receiving the second coded bit stream, performing rate matching, and generating a second rate matched bit stream; and
    first and second multiplexers for outputting the first and the second rate matched bit streams,
    wherein the initial offset value of the first rate matching algorithm processing unit is different from the initial offset value of the second rate matching algorithm processing unit.

4. The apparatus of claim 3, wherein the first rate matching algorithm processing unit and the second rate matching algorithm processing unit use the same algorithm.

5. A mobile terminal receiver of a telecommunication system, the mobile terminal receiver comprising:
    a deplexer for receiving and deplexing a radio frequency signal transmitted from two base stations;
    an analog receiver for receiving the deplexed signal from the deplexer, converting the deplexed signal to an intermediate frequency signal and amplifying the intermediate frequency signal;
    a searching unit for continuously searching pilot signals transmitted from the two base stations from among the signals received from the analog receiver and computing a signal-to-interference radio of each pilot signal;
    a base station controller for determining from which base station the signal searched by the searching unit was transmitted by using the computed signal-to-interference ratio;
    a plurality of rake receivers for providing the signals transmitted from the two base stations to a code combiner according to the determination of the base station controller;
    a code combiner for converting the signals from the two base stations into a plurality of kinds of data streams; and
    a repeating decoder for receiving, decoding and outputting the plurality of kinds of data streams as a single data stream,
    wherein the code combiner comprises:
    a first demultiplexer for classifying the signals transmitted from a first rake receiver by kinds;
    a second demultiplexer for classifying the signals from a second rake receiver by kinds;
    a deinterleaver for deinterleaving and restoring the signals from the second demultiplexer to their original signals;
    a first combiner for classifying signals from the deinterleaver and from the first demultiplexer into a single kind of signal; and
    a second combiner for receiving and classifying by kinds a predetermined signal from the first demultiplexer and a predetermined signal from the second demultiplexer.

6. The mobile terminal receiver of claim 5, wherein the code combiner comprises:
    a first demultiplexer for classifying and outputting the signals transmitted from a first rake receiver by kinds;
    a second demultiplexer for classifying and outputting the signals transmitted from a second rake receiver by kinds
    a deinterleaver for deinterleaving and restoring at least some of the signals from the second demultiplexer to their original signals:
    a first combiner for classifying the signals from the deinterleaver and at least some of the kinds of signals from the first demultiplexer into a single kind of signal; and
    a second combiner for receiving and classifying by kinds signals from the first demultiplexer other than the signals received by the first combiner from the first demultiplexer and signals from the second multiplexer other than the signals received by the deinterleaver from the second demultiplexer.

7. The mobile terminal receiver of claim 5, wherein the code combiner comprises:
    a first demultiplexer for classifying the signals from a first rake receiver by kinds;
    a second demultiplexer for classifying the signals from a second rake receiver by kinds;
    a first combiner for classifying signals from the second demultiplexer into a single kind of signal; and
    a second combiner for receiving and classifying by kinds signals from the first demultiplexer other than the signals received by the first combiner from the first demultiplexer and signals from the second demultiplexer other than the signals received by the first combiner from the second demultiplexer.

8. The mobile terminal receiver of claim 5, wherein the code combiner comprises:
   a first demultiplexer for classifying the signals from a first rake receiver by kinds;
   a second demultiplexer for classifying the signals from a second rake receiver by kinds;
   a first combiner for classifying signals from the second demultiplexer into a single kind of signal; and
   a second combiner for receiving and classifying by kinds a predetermined signal from the first demultiplexer and a predetermined signal from the second demultiplexer.

9. The mobile terminal receiver of claim 5, wherein the code combiner converts the signal from the two base stations to a first, second and third kind of data stream and the repeating decoder comprises:
   a first decoder for receiving and decoding the first and second data streams from the code combiner;
   a first interleaver for receiving and interleaving the decoded data stream from the first decoder;
   a second interleaver for receiving and interleaving the first and second data streams from the code combiner; and
   a second decoder for receiving and decoding the data streams from the first and the second interleavers and the third data stream from the code combiner to generate a single data stream.

10. The mobile terminal receiver of claim 9, wherein the repeating decoder further comprises a deinterleaver for deinterleaving the data stream from the second decoder and inputting the deinterleaved data stream to the first decoder.

11. A hand-off processing method for a mobile communication system, the method comprising:
   coding an input bit stream to generate a coded bit stream;
   interleaving the input bit stream to generate an interleaved bit stream;
   coding the interleaved bit stream to generate an interleaved coded bit stream;
   performing rate matching by using different patterns for the coded bit stream and the interleaved coded bit stream to generate first and second rate matched bit streams, the rate matching performed with different initial offset values for the coded bit stream and the interleaved coded bit stream; and
   outputting the first and second rate matched bit streams.

12. The method of claim 11, wherein the first and second coded bit streams are rate-matched such that initial offset values are one of 2 and 1 and 1 and 2.

* * * * *